United States Patent [19]
Dunlap

[11] Patent Number: 5,584,119
[45] Date of Patent: Dec. 17, 1996

[54] APPARATUS FOR SETTING SKEW ANGLE

[75] Inventor: Robert A. Dunlap, Fort Wayne, Ind.

[73] Assignee: General Electric Company, Fort Wayne, Ind.

[21] Appl. No.: 335,257

[22] Filed: Nov. 7, 1994

[51] Int. Cl.$^6$ .................................................. H02K 15/02
[52] U.S. Cl. .................. 29/732; 29/596; 414/27; 414/791.2
[58] Field of Search .............................. 29/732, 738, 596, 29/609; 414/27, 791.2

[56] References Cited

U.S. PATENT DOCUMENTS

| | | | |
|---|---|---|---|
| 3,075,106 | 1/1963 | Chi | 310/60 |
| 4,400,872 | 8/1983 | Berges . | |
| 4,736,516 | 4/1988 | Pfaffenzeller et al. | 29/732 |

*Primary Examiner*—Carl E. Hall
*Attorney, Agent, or Firm*—Ralph E. Krisher, Jr.

[57] ABSTRACT

A skew angle setting tool and method for assisting in orienting the skew pin of an apparatus having a mandrel for stacking rotor laminations for dynamoelectric machines is described. The skew pin is movable to have at least one predetermined angular orientation with respect to the axis of the mandrel. The tool includes a first member configured to be positioned in a generally coextensive relation with the mandrel and has at least one location thereon corresponding to a preselected rotor lamination stack height, and a second member disposed in predetermined relation to the location on the first member corresponding to the preselected rotor lamination stack height. The skew pin is positionable in registration with one or more locations on the second member to orient the skew pin in corresponding angular orientations with respect to the mandrel axis.

16 Claims, 8 Drawing Sheets

FIG_1

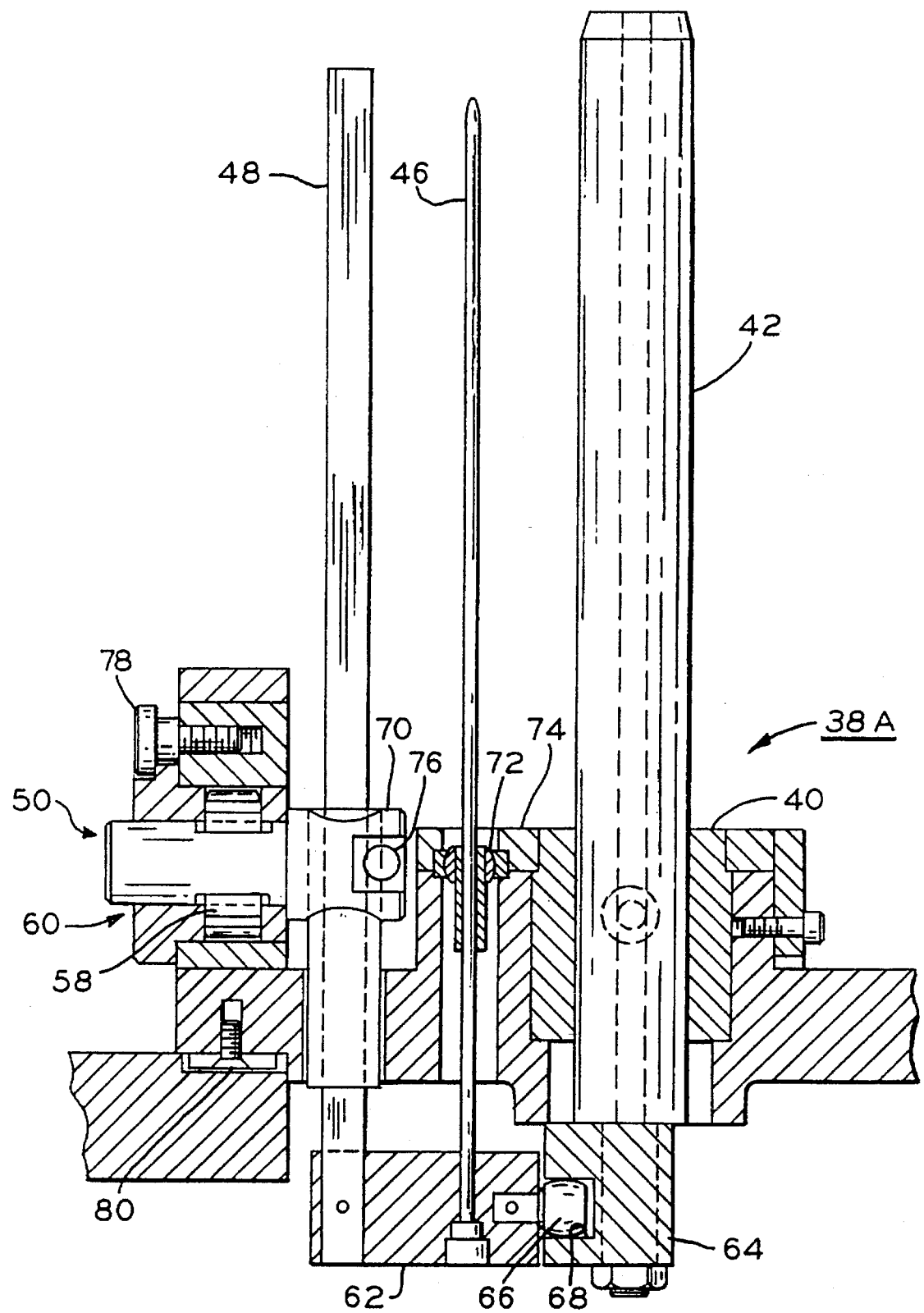
FIG_4

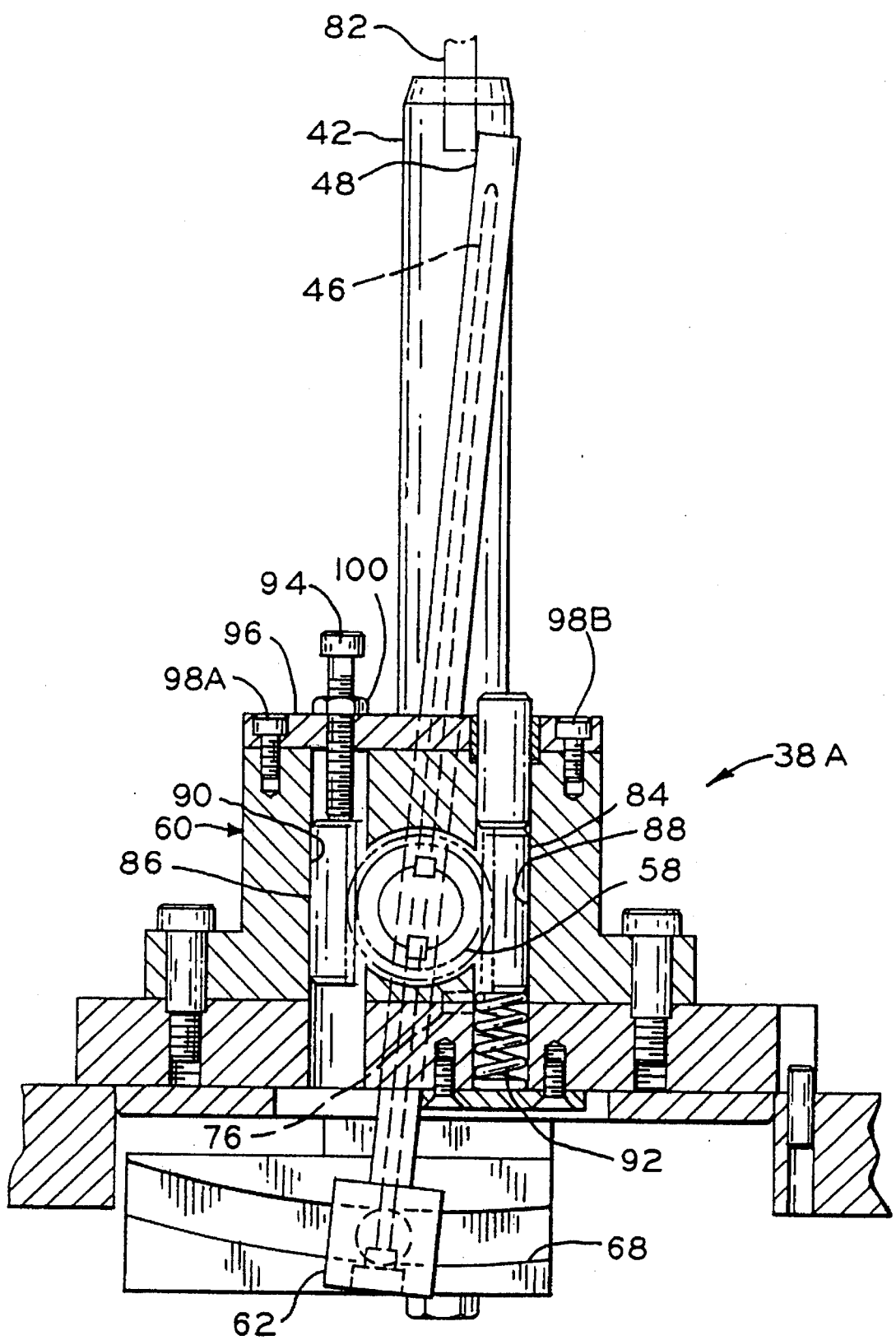
FIG_5

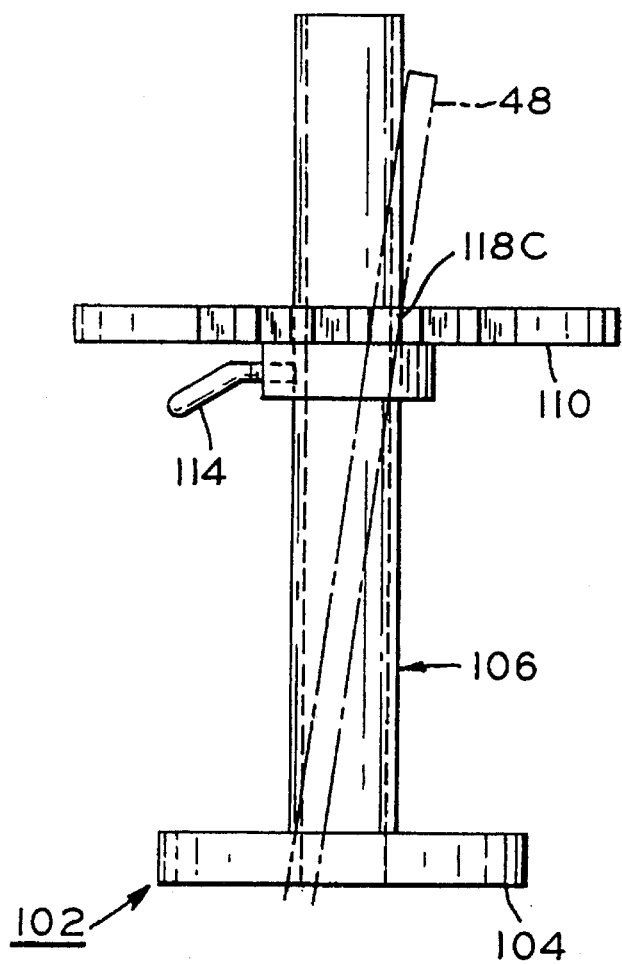
FIG_9
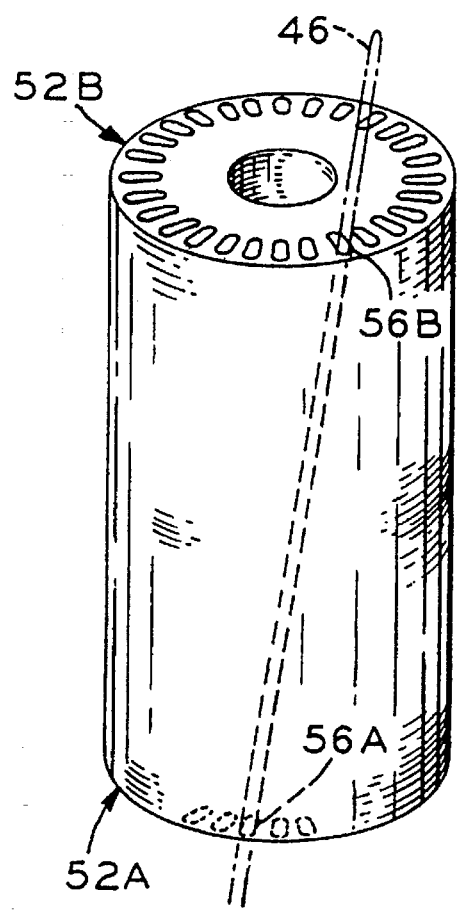
FIG_6

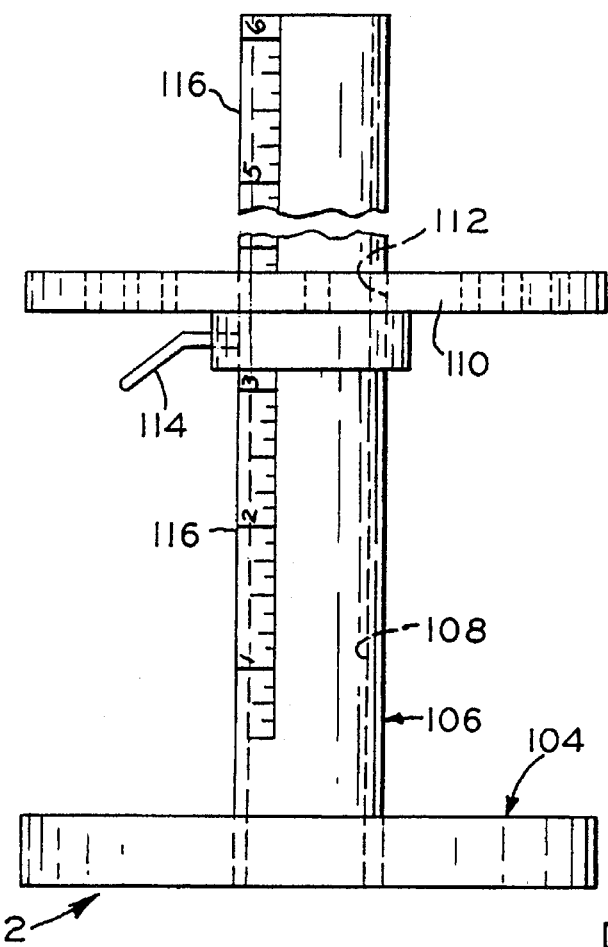
FIG_7
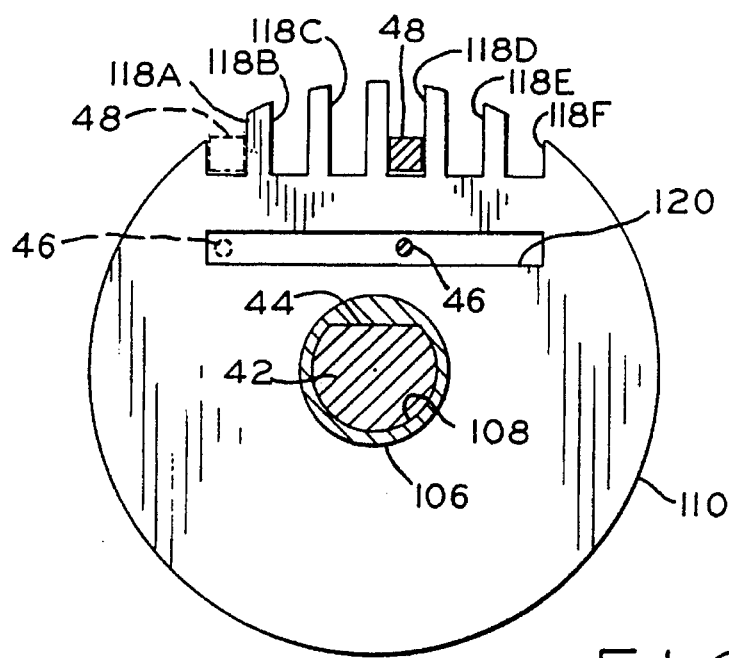
FIG_8

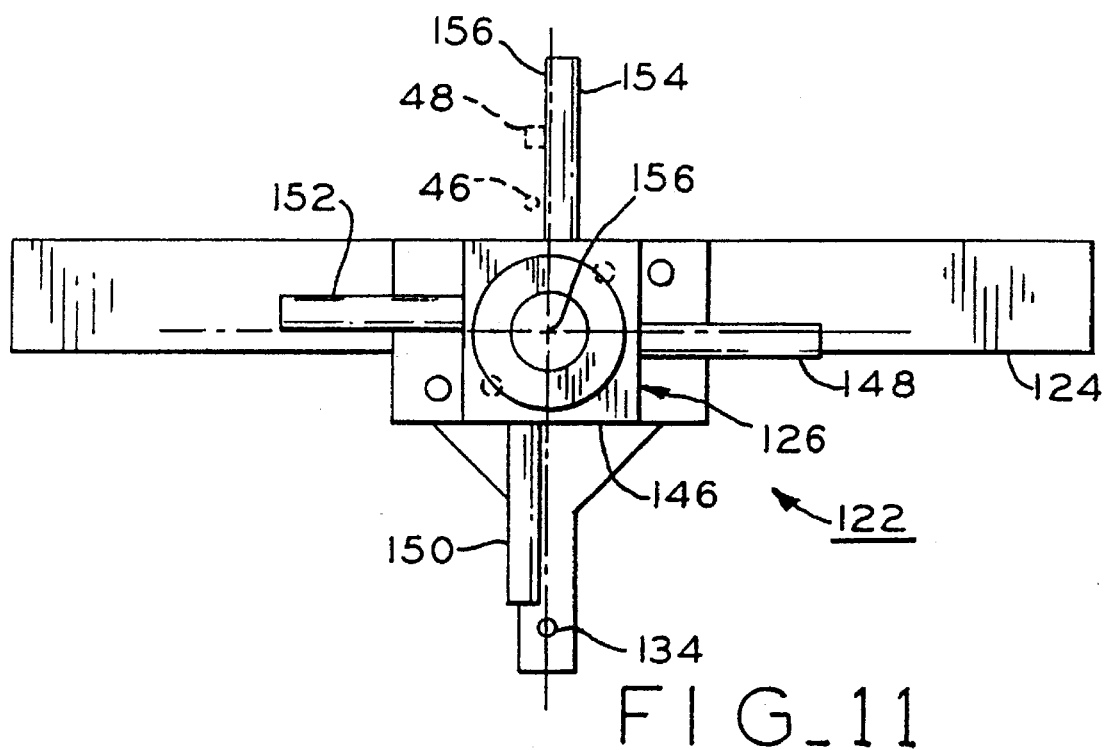
FIG_11
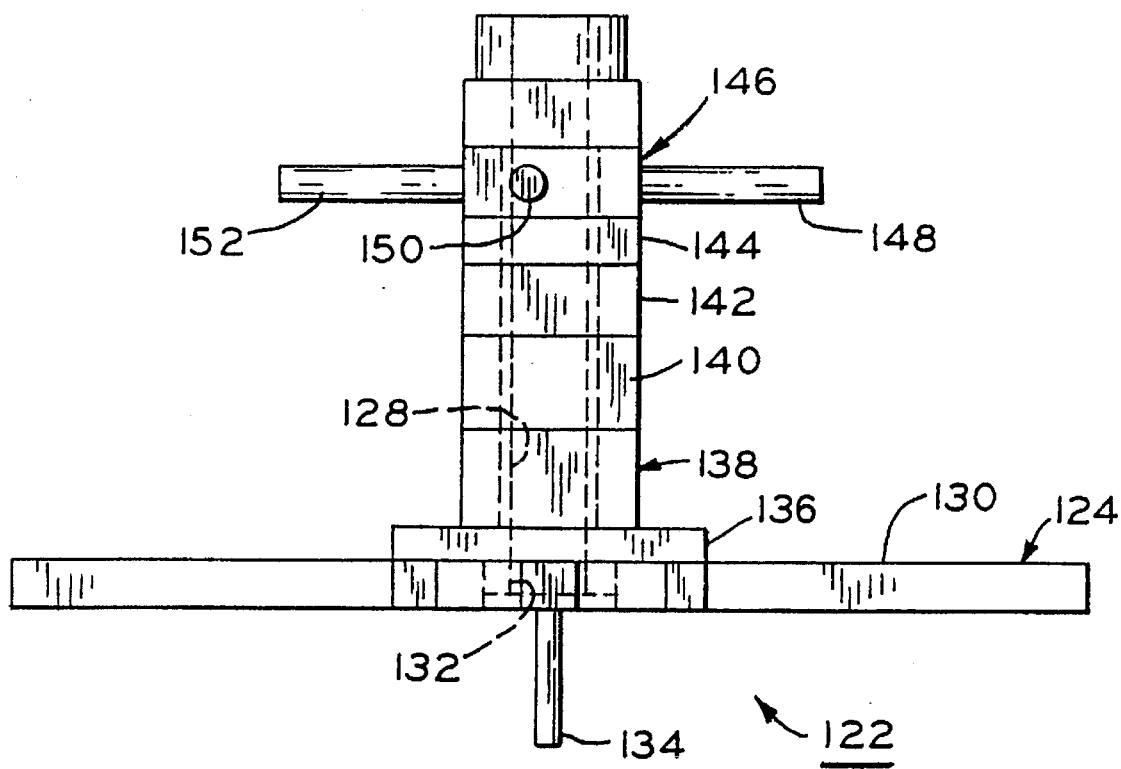
FIG_10

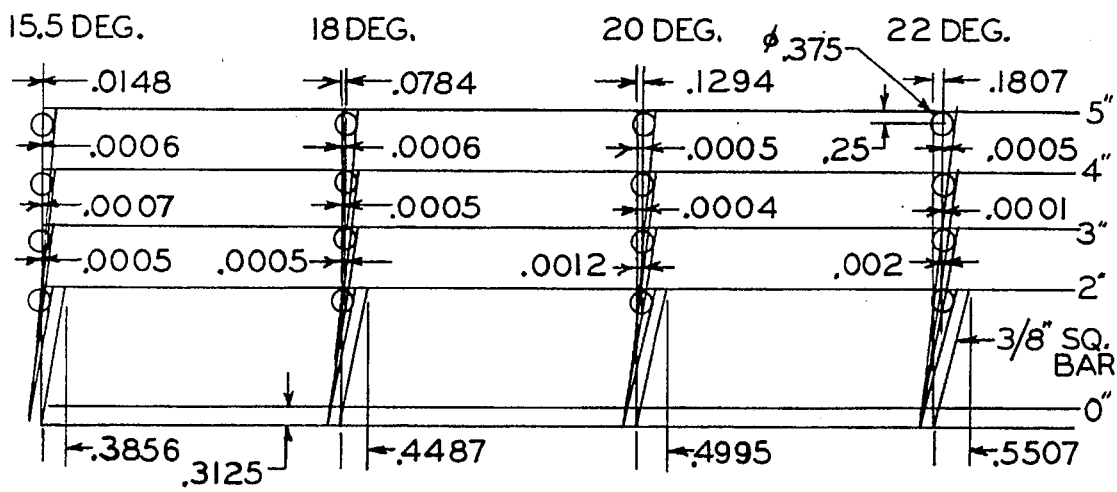
FIG_12
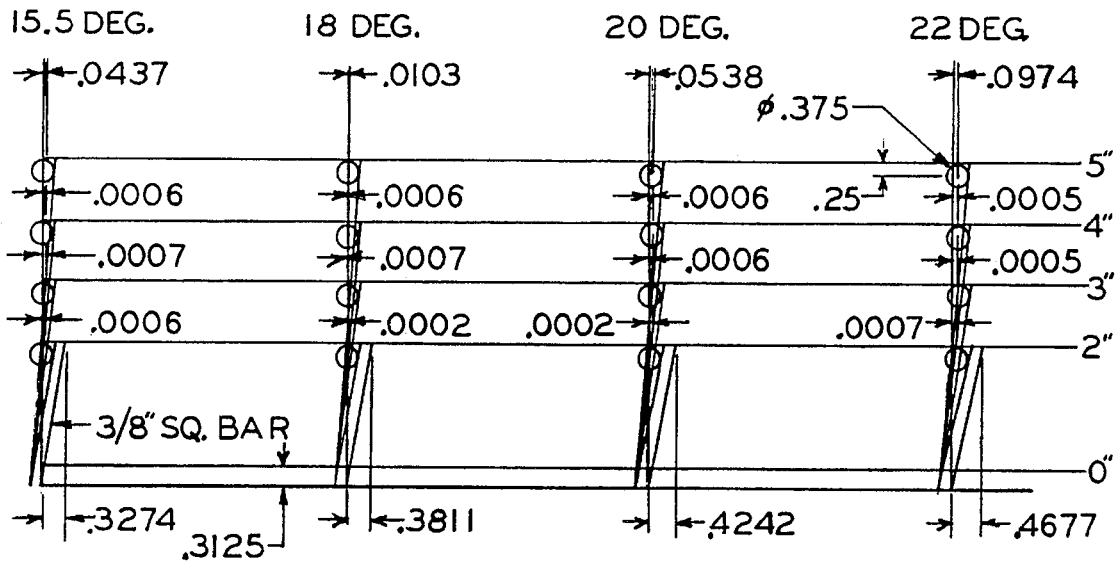
FIG_13

1

APPARATUS FOR SETTING SKEW ANGLE

FIELD OF THE INVENTION

This invention relates generally to assembling rotors for dynamoelectric machines and more particularly, to a method and apparatus for setting the skew angle of laminations forming such rotors.

BACKGROUND OF THE INVENTION

Dynamoelectric machines such as electric motors typically include a stator assembly having one or more windings, a rotor assembly rotatably mounted within the stator assembly, and a shell or housing surrounding the stator assembly. Energy losses sustained by a motor in converting electrical energy to mechanical power arise chiefly through the electrical and magnetic characteristics of the motor. For example, since the rotor of a motor is subjected to time-varying magnetic flux, eddy currents will be induced in it thereby causing some energy loss. To minimize this eddy-current loss, rotors typically are built up of thin members or laminations which are stacked together in what is known as "skewed" relation.

More specifically, rotor laminations are typically planar disc shaped members formed by a stamping operation. A typical rotor lamination includes a central opening and at least one skew pin hole located radially outwardly from the central opening. Each lamination is identical to the other laminations forming a particular rotor, and a predetermined number of laminations of known thickness can be stacked to form a rotor of a desired height or length. The laminations are stacked with the center openings thereof concentric. To provide the "skewed" relation between the laminations, the laminations are rotated relative to one another about their common central axis such that the skew pin holes of successive laminations are progressively angularly offset from the skew pin hole of the first lamination. The angle of rotation between the skew pin hole of the last or top lamination and that of the first or bottom lamination is known as the "skew angle".

The laminations can be assembled into a stack for making a rotor using a wide variety of assembly techniques, for example, utilizing a four station assembly process. In this example, a first work station is provided for stacking the laminations to a desired height. A second work station is provided for measuring the height of the lamination stack to ensure that the proper number of laminations have been stacked at the first station. A third work station is provided for setting the skew angle and welding the laminations together. A fourth work station is provided for unloading the welded laminations. The four work stations are located at spaced locations adjacent the periphery of a rotatable table. The table is provided with tooling or fixturing at spaced work locations or positions around a central axis of rotation of the table such that when one work location is positioned, for instance, at the first work station for stacking the laminations, a second work location is positioned at the second station for measuring.

Tooling or fixturing at each work location can include means forming a planar surface for receiving and locating the first lamination, a central mandrel, and an adjustable skewing pin. The central mandrel is typically fixed in position in an upward orientation perpendicular to the planar locating surface. The skew pin also extends upwardly but is mounted so that it may be angularly rotated relative to the central mandrel by moving a skew pin angle setting arm relative to the central mandrel.

To stack the laminations on the work location, the central opening of a lamination is aligned with the central mandrel and the skew pin hole is aligned with the top of the skew pin. The lamination is then slid down the central mandrel and skew pin to a position on the planar surface of the work location or on top of the previously loaded lamination. As discussed above, laminations are loaded in this manner until the desired stack height is attained.

When the skew pin is angularly rotated relative to the central mandrel, the stacked laminations also are rotated about the mandrel such that the respective skew pin holes of the laminations are offset from one another. That is, although the central openings of the stacked lamination are axially aligned, the axes of the skew pin holes are angularly offset from one another, and the skew pin hole of the topmost lamination will be offset from the bottom lamination by the desired skew angle.

To set up the four work locations in the above example, skew pin adjustments must be made for each of the locations. Particularly, each skew pin at each work location must be set to be disposed at the same skew angle to enable accurate assembly of the rotors. In the past, given the desired skew angle and lamination stack height, an operator first calculated the angular orientation of the skew pin. The operator then set the skew pin angle at each work location utilizing a protractor to visually align the skew pin for that work location to the desired setting.

Calculating the skew pin angle and setting the skew pin at four work locations is a time consuming process. In addition, since such setting requires an operator to visually set the skew pin angle utilizing a protractor, such setting is susceptible to operator error. An operator must be extremely careful to ensure that the skew pin angle is set to precisely the same angle at each location. Moreover, the operator must make separate calculations for each different combination of stack height and skew angle used to make different rotors. Making such calculations and setting the pin skew angles using a protractor for visual alignment certainly is less than desirable, particularly due to the time and operator skill required.

Accordingly, it is desirable and advantageous to provide a method and apparatus which greatly simplifies the process of setting the skew pin angle by eliminating the need for an operator to make mathematical calculations. It also is desirable and advantageous to provide a method and apparatus which does not require reading a protractor or other instrument in setting the skew angle.

An object of the present invention is to provide a skew pin angle setting method and apparatus which enables an operator to simply locate the skew pin to a predetermined alignment position to set a desired skew angle.

Another object of the present invention is to provide a skew pin angle setting method and apparatus which reduces the amount of time required to set the skew pin angle.

Yet another object of the present invention is to provide a skew pin angle setting method and apparatus which reduces the possibility for operator error and improves consistency in making skew pin angle settings at a number of work locations.

Still another object of the present invention is to provide a skew pin angle setting method and apparatus which eliminates any need for an operator to make mathematical calculations in determining the setting for a skew pin.

SUMMARY OF THE INVENTION

These and other objects of the invention are attained by several forms of apparatus adapted to enable an operator to select a desired rotor height for a particular rotor assembly, select the skew angle, and quickly and easily adjust the skew pin angle accordingly for one or more work locations, without requiring calculations, protractor settings, and other steps requiring operator training and skill. In one form of the invention, a central sleeve member having a plurality of graduations or indications thereon corresponding to different rotor lamination stack heights is provided. The sleeve member defines a passage and is sized to receive the central mandrel of a work location. An adjustable member is mountable on the sleeve member at a selected graduation or location corresponding to a particular stack height. The adjustable member can be fixed in position on the sleeve member utilizing any suitable means such as a lock screw. The adjustable member includes a plurality of skew angle notches engageable by the skew pin setting arm. Each notch corresponds to a predetermined skew angle. By disposing the setting arm in the notch corresponding to the desired skew angle, the desired skew angle may be set.

In another form of the invention, a plurality of stackable members of predetermined thickness are used to select the desired stack height. Particularly, the members have openings therethrough adapted for receiving the central mandrel of a work location so that the members can be stacked in overlaying relation to the central mandrel. One of the stackable members includes one or more arms extending outwardly from the opening formed in the stackable member. The arms are positioned to correspond to a predetermined skew angle. By disposing the skew angle setting arm against the arm corresponding to the desired skew angle, the desired skew angle may be set.

The above-discussed forms of the present invention simplify the process of setting the skew angle by eliminating the need for an operator to make a mathematical calculation and physically aligning the skew pin with a protractor or other instrument. An operator simply sets the tool to the desired rotor lamination stack height and then, with the skew angle setting means in place, disposes the skew angle setting arm at a selected position and sets the skew angle, such as by adjusting a stop member that limits movement of the setting arm. Such skew angle setting tool reduces the amount of time required to set the skew pin angle, reduces the possibility for operator error, and improves consistency in making skew pin angle settings.

BRIEF DESCRIPTION OF THE DRAWINGS

FIG. 4 is a fragmentary side elevation view of the apparatus of FIG. 2 taken along line 4—4 of FIG. 2;

FIG. 5 is a fragmentary rear elevation view of the apparatus of FIG. 2 taken along line 5—5 of FIG. 2;

FIG. 6 is a perspective view depicting a stack of rotor laminations including in phantom lines the skew pin of the apparatus of FIG. 1 extending through the laminations to illustrate a skew angle;

FIG. 7 is a front elevational view of one form of a skew angle setting tool according to the present invention;

FIG. 8 is a top plan view of the setting tool of FIG. 7;

FIG. 9 is a from elevational view of the setting tool of FIG. 7 showing in phantom lines the skew angle setting arm of the apparatus of FIG. 1 disposed in a notch on the tool;

FIG. 10 is a from elevational view of another form of a skew angle setting tool according to the present invention;

FIG. 11 is a top plan view of the tool of FIG. 10 showing the skew pin setting arm and skew pin of the apparatus of FIG. 1 in associated therewith;

FIG. 12 is a table illustrating the skew arm offset values for the member of FIG. 11 corresponding to several combinations of stack height and skew angle for a 3 inch diameter stator core; and FIG. 13 is a table illustrating the skew arm offset values for the member of FIG. 11 corresponding to several combinations of stack height and skew angle for a 2.6 inch diameter stator core.

DETAILED DESCRIPTION OF THE DRAWINGS

Figure 1:
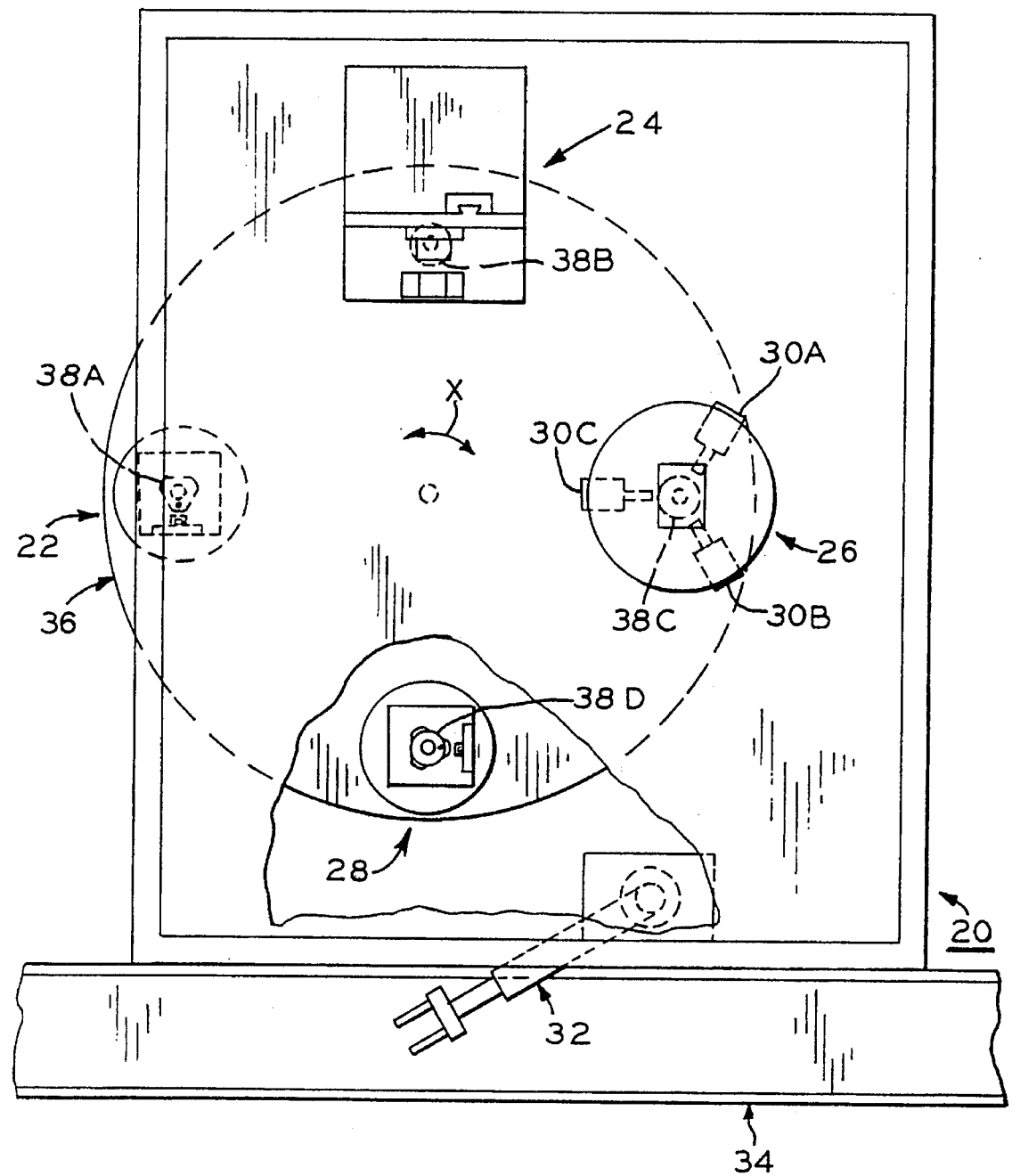
FIG. 1 is a top plan view of a four station apparatus for stacking and welding rotor laminations for dynamoelectric machines.

FIG. 1 is a top plan view, with portions cut-away, of a four station assembly apparatus 20 utilized in stacking and welding rotor laminations for dynamoelectric machines. With respect to the four station assembly device 20, a first work station 22 is provided for stacking the laminations to a desired height, a second work station 24 is provided for measuring the height of the lamination stack to ensure that the proper number of laminations have been stacked at first station 22, a third work station 26 is provided for skewing the laminations and then welding the laminations together, and a fourth work station 28 is provided for unloading the welded laminations.

The specific equipment utilized at each work station 22–28 varies depending upon the task being performed. For example, at third work station 26, three welding heads 30A–C are utilized to weld the lamination stack. At fourth work station 28, a robotic arm 32 is provided to lift the welded lamination stack and place the stack on a conveyor 34. Stations 22–28 are positioned at locations along the periphery of a table 36, which table 36 is rotatable about a central axis as illustrated by the arrow X. Four work locations 38A–D are located at equally spaced positions around the periphery of rotatable table 32. Work locations 38A–D are positioned so that when any one work location is operatively aligned with a work station, the other work locations also are operatively aligned, respectively, with one of the other work stations.

The present invention, of course, is not limited to use with any particular type of work station arrangement. The system illustrated in FIG. 1 therefore is provided just to illustrate one type of environment in which the present invention is useful. The present invention may be utilized in many other types of work environments such as, for example, with the apparatus described in U.S. Pat. No. 4,400,872, which is assigned to the present assignee.

Figure 2:
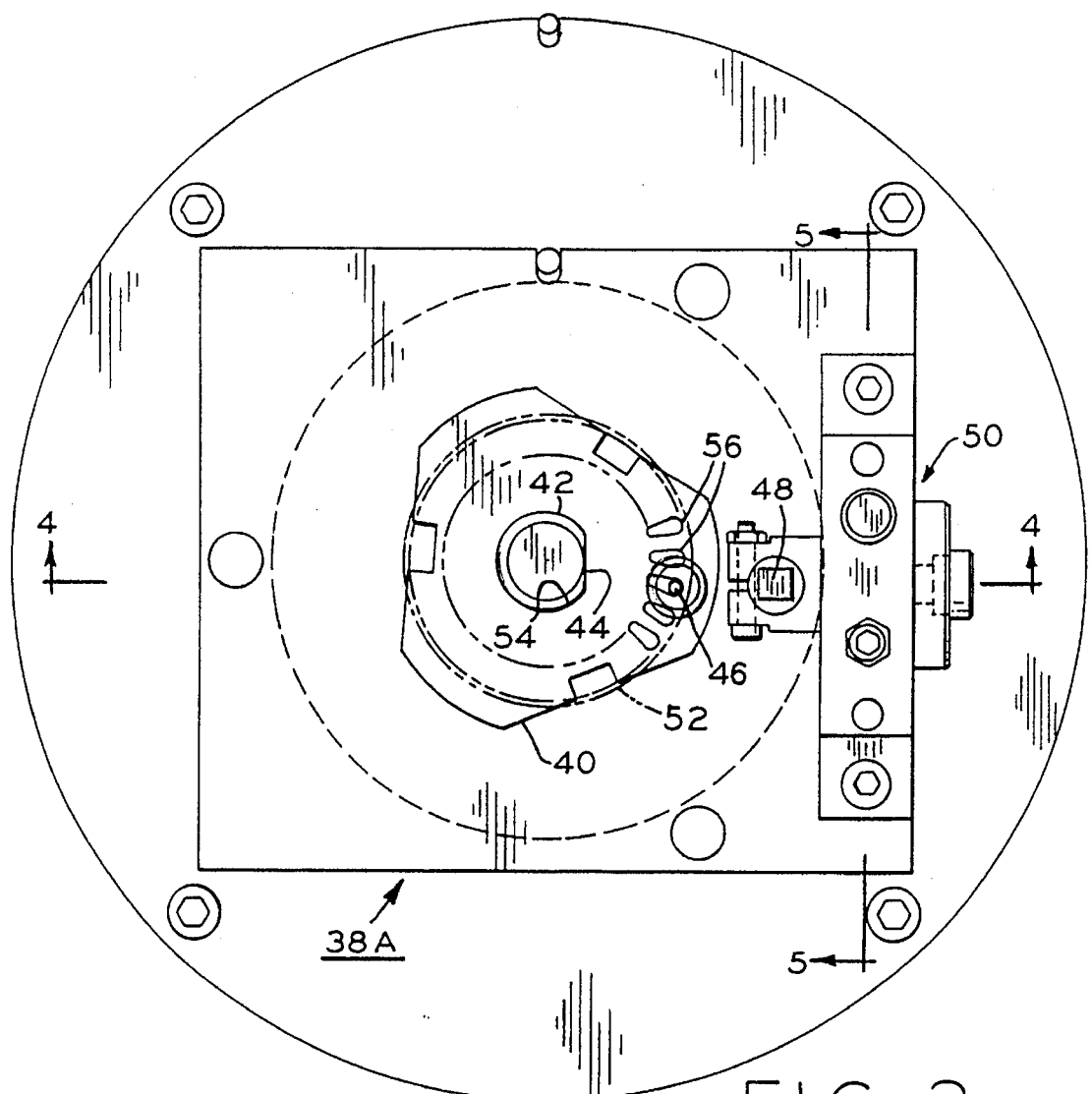
FIG. 2 is an enlarged top plan view of one station of the rotor lamination stacking apparatus of FIG. 1.

FIG. 2 is a top plan view of first work location 38A of FIG. 1, which work location 38A is typical of each of the other work locations 38B–D. Work location 38A includes a base member 40 defining a planar surface for receiving and locating a first rotor lamination. Work location 38A further includes an elongated central mandrel 42 extending upwardly from base member 40 and perpendicular to the plane of base member 40. Central mandrel 42 is cylindrical shaped and has a longitudinally extending flat surface 44 extending along its length. A skew pin 46 also extends upwardly from base member 40. Skew pin 46 is attached to a skew pin angle setting arm 48 which is pivotally movable relative to central mandrel 42 to enable adjusting the angle of skew pin 48 relative to mandrel 42. A gear unit 50 controls pin 46 and arm 48, and is hereinafter described and illustrated in more detail.

Figure 3:
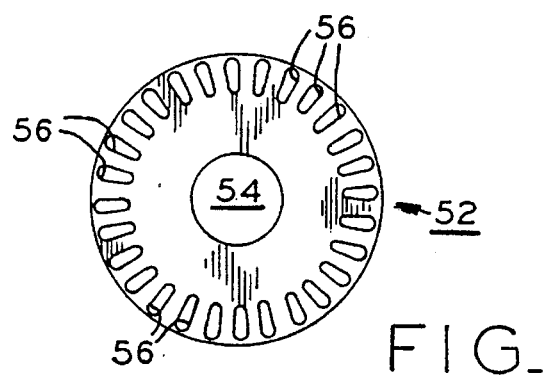
FIG. 3 is a top plan view of a rotor lamination for use with the stacking apparatus of FIG. 1.

FIG. 3 is a top plan view of a typical rotor lamination 52. Rotor lamination 52 is a generally planar disc shape member defining a central opening or hole 54 therethrough. Rotor lamination 52 importantly also includes a plurality of skew holes 56 therethrough. Skew holes 56 are located at angularly spaced positions radially outwardly from central hole 54. Central hole 54 of lamination 52 is adapted for cooperatively receiving the central mandrels 42 of each of the work stations 38A–D, and each of the skew pin holes 56 is adapted for receiving skew pin 46, as shown for example in phantom lines in FIG. 2.

FIG. 4 is a side elevational view of work location 38A, and shows the relative positions of central mandrel 42, skew pin 46 and skew pin angle setting arm 48. To stack laminations 52 (not shown in FIG. 4) on work location 38A, central opening 54 of lamination 52 is aligned with central mandrel 42. Skew pin hole 54 formed in lamination 52 is aligned with the top of skew pin 46, and lamination 52 is then slid down central mandrel 42 and skew pin 46 onto base member 40 or on the previously loaded lamination. Laminations are loaded in this manner until the desired stack height is obtained.

Gear unit 50 is illustrated in cross-section in FIG. 4. Unit 50 includes a rotatable gear 58 disposed within a housing 60. Gear 58, as described hereinafter, controls movement of arm 48 and generally normally biases arm 48 so that its axis is substantially parallel to the axis of mandrel 42. A connecting arm 62 couples skew angle setting arm 48 and skew pin 46.

Connecting arm 66 is coupled to a mandrel holding member 64 by a slider 66 disposed within a groove 68 formed in member 64.

Setting arm 48 is mounted to gear 58 by a first hinge member 70 which allows arm 48 to rotate relative to housing 60. Also, skew pin 46 is mounted by a second hinge member 72 to a fixture 74 so that skew pin 46 may rotate with arm 48. Particularly, since skew pin 46 and setting arm 48 are connected at their lower portions by connecting member 62, as arm 48 rotates so does pin 46. A stop pin 76 is illustrated as being mounted in an operative relationship with arm 48 and, as described hereinafter, is utilized to limit the movement of arm 48. A number of other elements such as bolts 78 and 80 utilized in mounting housing 60 and holding various components of unit 50 in place are illustrated. Importantly, the drawings and description of unit 50 are provided just for background purposes to describe one context in which the present tool can be utilized.

FIG. 5 is a rear view of work location 38A, showing skew pin 46 and skew pin angle setting arm 48 at one selected angular orientation relative to central mandrel 42. With respect to FIG. 5, location 38A is disposed at third work station 26. Particularly, an arm 82 at such station 26 contacts arm 48 and moves arm 48 to the angularly offset position as shown. By rotating arm 48, skew pin 46 also rotates thereby skewing laminations (not shown in FIG. 5) stacked on mandrel 42. Once the laminations are so skewed, the welding operation is performed.

With respect to gear 58, a first geared plunger 84 and a second geared plunger 86 are disposed in channels 88 and 90, respectively. A spring 92 disposed in channel 88 biases plunger 84 upward. Such spring biasing results in gear 58 being normally biased to rotate counterclockwise. Of course, as gear 58 rotates counterclockwise, setting arm 48 and skew pin 46 also rotate. Stop pin 76 limits the amount of such rotation once setting arm 48 makes contact with such pin 76. Stop pin 76 is disposed so that rotation of setting arm 48 is stopped in the counterclockwise direction once the axis of setting arm 48 is substantially parallel to the axis of mandrel 42.

With respect to setting the skew angle, an adjustable skew angle stop bolt 94 is threadedly engaged to a stop plate 96 mounted to housing 60 by bolts 98A–B. A threaded nut 100 assists in maintaining the selected location of stop bolt 94 relative to plate 96. As shown, stop bolt 94 limits the movement of second plunger 86, which in turn, limits the clockwise rotation of gear 58. Such a limit, of course, further limits the rotation of setting arm 48 and skew pin 46. By adjusting the depth at which the end of stop bolt 94 is disposed within channel 90, the limit on the amount of rotation of gear 58 is correspondingly limited. The skew angle therefore may be adjusted by selecting the position of stop bolt 94 within channel 90. Specifically, robotic arm 82 rotates setting arm 48 until second plunger 86 contacts stop bolt 94. Once such contact is made, arm 82 maintains setting arm 48 in such position until completion of the welding operation, thereby fixing the laminations at the selected skew angle.

FIG. 6 is an illustration representative of a stack of rotor laminations of a desired height. Skew pin 46 extends through a skew pin hole 56A of a first or bottommost rotor lamination 52A and through skew pin hole 56B of an uppermost or top rotor lamination 52B. The angular orientation of skew pin 46 illustrates the skew angle for the stack of laminations 52.

FIG. 7 illustrates a skew angle setting tool 102 embodying the present invention in one form thereof. Particularly, tool 102 includes a base plate 104 and a sleeve 106 mounted thereon. Sleeve 106 defines a passage 108 therethrough having a central axis perpendicular to the planar top surface of base plate 104. An opening 108 formed in plate 104 is aligned and coaxial with sleeve passage 108.

An adjustable plate 110 having a central opening 112 is mounted to sleeve 106 by passing sleeve 106 through plate central opening 112. A lock screw 114 threadedly engaged with adjustable plate 110 is engageable with sleeve 106 to maintain the position of adjustable plate 110 relative to sleeve 106. Graduations 116 are provided along a portion of the length of sleeve 106 to indicate the position of adjustable plate 110 relative to the planar top surface of base plate 104.

As best shown in FIG. 8, adjustable plate 110 also has a plurality of skew pin alignment notches 118A–F formed therein along its outer circumference. A skew pin slot 120 is also provided in the adjustable plate.

In performing a work location set-up, an operator is provided with the present tool along with an indication as to which notch 118A–F skew pin 46 is to be aligned with for the particular rotor construction to be assembled, as well as the height selected for the particular rotor construction. The operator then aligns central mandrel 42 with opening 108 formed in base plate 104 and sleeve 106 and slides tool 102 over central mandrel 42. Proper alignment of notches 118A–F and slot 120 with skew angle setting arm 48 and skew pin 46, respectively, can be maintained by engaging a set screw or other means (not shown) on sleeve 106 with flat surface 44 of central mandrel 42. Skew pin 46 passes through skew pin slot 120 formed in adjustable plate 110 when tool 102 is installed, and skew pin angle setting arm 48 can then be aligned with and inserted into one notch 118 formed in adjustable plate 110 to set the skew angle such as by adjusting stop bolt 94 (not shown in FIG. 8).

For illustration, skew pin angle setting arm 48 is shown in a first position in notch 118D, which positions skew pin 46 as shown in slot 120. Skew pin angle setting arm 48 is shown in phantom lines in a second position in notch 118A, and skew pin 46 is shown in phantom lines in corresponding position in slot 120.

FIG. 9 shows skew pin angle setting arm 48 in a third position in notch 118C of adjustable plate 110, illustrating another alternative skew pin orientation. After an operator selects a desired slot on tool 102 for skew pin angle setting arm 48, the desired position can be set by adjusting stop bolt 94 as hereinbefore described. Tool 102 can then be lifted off of central mandrel 42 and the work location is ready for stacking of rotor laminations 52. FIGS. 10 and 11 illustrates a skew angle setting tool 122 embodying the present invention in another form thereof. Particularly, tool 122 includes a base plate 124 having a column 126 mounted thereon. Column 126 defines a passage 128 therethrough having a central axis perpendicular to a planar top surface 130 of base plate 124. An opening 132 formed in base plate 124 is aligned and coaxial with column passage 128. A locating pin 134 is mounted on base plate 124 and extends downwardly therefrom. Locating pin 134 is insertable in a hole (not shown) provided at a work location as central mandrel 42 of the work location is inserted through opening 132 of base plate 124 for orienting base plate 124 in predetermined relation to central mandrel 42.

Column 126 is formed of a plurality of stackable members, including a lower bushing member 136 adapted for mounting to top surface 130 of base plate 124, and a number of spacers 138, 140, 142 and 144 positionable on member 136. Each spacer 138–144 may be of a different known thickness and includes a central passage therethrough forming a segment of passage 128, and means for mounting to the adjoining spacer (not shown). Importantly, using various combinations of spacers 138–144, column 126 can be assembled to any desired height corresponding to a particular rotor lamination stack height. The stackable members also include a skew angle setting member 146 mountable on spacers 138–144 for setting the skew angle for a rotor lamination stack of the desired height. Skew angle setting member 146 includes a plurality of elongated cylindrical arms 148, 150, 152, and 154 extending outwardly from column 126 for setting the skew angle.

As best shown in FIG. 11, the axis of each arm 148–154 is offset with respect to central axis 156 of column 126 by a predetermined amount. When tool 122 is positioned on a work location with a central mandrel located in passage 128 of column 126, and locating pin 134 inserted into a locating hole associated with the work location for aligning the tool with the work location, one of the arms 148–154 will be positioned so as to be engageable by skew pin angle setting arm 48 of the work location. In this regard, skew angle setting member 146 is mountable on the uppermost spacer 144 in any of four different orientations 90° apart. In each orientation only one of the arms 148–154 extends outwardly from column 126 in position for engagement by skew pin angle setting arm 48. In the setup shown in FIG. 11, arm 154 is shown in such position. Skew angle setting member 146 could be mounted on column 126 such that any of the other arms 148–154 is similarly positioned for engagement with skew pin angle setting arm 44.

The offset relation of arms 148–154 relative to column axis 156 positions one edge or surface of the selected arm, as discussed above, at the proper location for setting skew pin 46 at a selected skew angle for a particular rotor lamination stack height. For example, edge 156 of arm 154 is shown in engagement with skew pin angle setting arm 48 for setting one skew pin angle. Again, skew angle setting member 146 could be mounted on column 126 with any of the other arms 148–154 positioned at the location of arm 154, and the different offsets of the respective arms would locate skew pin angle setting arm 48 at a different skew angle. Additionally, different skew angles setting members having arms located at various offset values can be provided for setting the skew angle for rotor laminations for use in different diameter stator cases.

For example, FIG. 12 is a table showing the setting member arm of offset values for setting skew angles of 15.5°, 18°, 20° and 22° for rotor lamination stack heights of 2 inches, 3 inches, 4 inches, and 5 inches, for a 3 inch diameter stator core. Similarly, FIG. 13 is a table showing the offset values for skew angle setting member arms for setting skew angles of 15.5°, 18°, 20° and 22° for rotor lamination stack heights of 2 inches, 3 inches, 4 inches and 5 inches, for a 2.6 inch diameter stator core.

The above-described embodiments of the present tool simplify the process of setting the skew pin angle by eliminating the need for an operator to make a mathematical calculation in station set up and the need for visual alignment of the skew pin with a protractor in setting the skew angle. An operator simply sets the tool to the desired stack height and then, once the tool is placed in proper position relative to the skew angel setting arm, disposes the arm in a selected plate notch or against an arm of the tool. Such a mechanical alignment of an angle setting arm into an adjustment plate notch or against an arm or other means reduces the amount of time required to set the skew pin angle and reduces the possibility for operator error and improves consistency in making skew pin angle settings.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A skew angle setting tool for assisting in orienting the skew pin of an apparatus having a mandrel for stacking rotor laminations for a dynamoelectric machine, the skew pin being movable to at least one predetermined angular orientation with respect to the axis of the mandrel, said tool comprising:

skew pin angle indicating means for facilitating adjustment of the skew pin to a desired angular orientation relative to the mandrel; and height selection means for selecting and setting the location of said skew pin angle indicating means to the desired location corresponding to the lamination stack height along the length of the mandrel.

2. A skew angle setting tool in accordance with claim 1 wherein said skew pin angle indicating means comprises an adjustment plate including a plurality of skew pin alignment notches formed therein along an outer circumference thereof.

3. A skew angle setting tool in accordance with claim 2 wherein said height selection means comprises a sleeve having a passage therethrough, said passage being sized to receive the mandrel, and said adjustment plate further includes a central opening so that said adjustment plate may be mounted to said sleeve by passing said sleeve through the central opening.

4. A skew angle setting tool in accordance with claim 3 wherein said height selection means further comprises a lock screw threadedly engaged to said adjustment plate and engageable with said sleeve to maintain a selected position of said adjustment plate relative to said sleeve.

5. A skew angle setting tool in accordance with claim 1 wherein said skew pin angle indicating means comprises a member having a central body and a plurality of elongated arms extending outwardly therefrom, each of said elongated arms being positionable relative to the mandrel to correspond to a predetermined skew angle.

6. A skew angle setting tool in accordance with claim 5 wherein said height selection means comprises a plurality of spacers, said spacers being configured to be stacked, and said member having said elongated arms extending therefrom is configured to mount on an upper surface of the uppermost spacer.

7. A skew angle setting tool in accordance with claim 6 wherein each of said spacers and said member have a central passage sized to have the mandrel passed therethrough.

8. A skew angle setting tool for assisting in orienting the skew pin of an apparatus having a mandrel for stacking rotor laminations for a dynamoelectric machine, the skew pin being movable to have at least one predetermined angular orientation with respect to the axis of the mandrel, said tool comprising a first member configured to be positioned in a generally coextensive relation with the mandrel, said first member having at least one location thereon corresponding to a preselected rotor lamination stack height, and a second member disposed in predetermined relation to the location on said first member corresponding to the preselected rotor lamination stack height, said second member having a location thereon corresponding to the position of the skew pin when the pin is disposed at the desired predetermined angular orientation such that when the skew pin is located in registration with the location on said second member, the skew pin will be located at the predetermined angular orientation.

9. The skew angle setting tool of claim 8 wherein said first member includes a plurality of locations corresponding to a plurality of preselected rotor lamination stack heights, and said second member is slidably mounted to said first member so as to be disposed in registration with any one of the respective locations.

10. The skew angle setting tool of claim 8 wherein said first member is a tubular member positionable in overlaying relation to the mandrel.

11. The skew angle setting tool of claim 8 wherein the apparatus for stacking rotor laminations includes a skew pin angle setting arm, and said second member includes a plurality of notches for receiving the arm for positioning the arm at locations corresponding to predetermined angular orientations of the skew pin with respect to the mandrel axis.

12. The skew angle setting tool of claim 8 wherein said second member includes at least one arm member extending outwardly therefrom, the skew pin being positionable in registration with said arm for orienting the skew pin at the desired predetermined angular orientation with respect to the mandrel axis.

13. A skew angle setting tool for assisting in orienting the skew pin of an apparatus having a mandrel for stacking rotor laminations for a dynamoelectric machine, the skew pin being movable to have at least one predetermined angular orientation with respect to the axis of the mandrel, said tool comprising;

a first member positionable in generally parallel relation to the mandrel axis, said first member having at least one location thereon corresponding to a preselected rotor lamination stack height; and a second member mountable on said first member in predetermined relation to said at least one location thereon corresponding to a preselected rotor lamination stack height, said second member including skew angle indicators, whereby when said second member is mounted on said first member and said first member is positioned in parallel relation to the central mandrel axis, the skew pin can be positioned at a predetermined location with respect to said angle indicators so as to be oriented in the predetermined angular orientation with respect to the central mandrel axis.

14. The skew angle setting tool of claim 13 wherein said first member is of tubular construction and said second member comprises a plate slidably mounted on said first tubular member, said second member further including at least one notch formed therein corresponding to the one predetermined angular orientation.

15. The skew angle setting tool of claim 13 wherein said first member comprises a plurality of stackable spacers of known thickness, the overall thickness of said plurality of spacers corresponding to the preselected rotor lamination stack height, said second member being mountable on said spacers.

16. The skew angle setting tool of claim 15 wherein said second member is positionable on said spacers at more than one orientation corresponding to different skew pin angular orientations relative to said mandrel axis.

* * * * *